United States Patent [19]

Herrera-Gutierrez

[11] 4,451,246
[45] May 29, 1984

[54] MEANS AND METHODS OF MAKING BAGS WITH SPOUTS

[75] Inventor: Jesus Herrera-Gutierrez, Dallas, Tex.

[73] Assignee: American Interpac Corporation, Dallas, Tex.

[21] Appl. No.: 322,512

[22] Filed: Nov. 18, 1981

Related U.S. Application Data

[63] Continuation-in-part of Ser. No. 226,536, Jan. 19, 1981.

[51] Int. Cl.³ ............................................... B31B 1/90
[52] U.S. Cl. ..................... 493/215; 493/927; 493/213
[58] Field of Search ............... 493/215, 214, 927, 929, 493/213; 229/62, 65

[56] References Cited

U.S. PATENT DOCUMENTS

| | | | |
|---|---|---|---|
| 2,342,406 | 2/1944 | Latta et al. | 493/215 X |
| 2,855,137 | 10/1958 | Simonsen | 229/65 |
| 3,150,813 | 9/1964 | Wellman | 229/65 |
| 3,418,891 | 12/1968 | Rivman et al. | 493/215 X |
| 3,510,052 | 5/1970 | Ruda | 493/214 X |
| 3,534,520 | 10/1970 | Moran | 493/215 X |
| 3,589,595 | 6/1971 | White | 229/65 X |
| 4,126,085 | 11/1978 | Mowli et al. | 493/215 X |
| 4,138,932 | 2/1979 | Mowli et al. | 493/215 X |

Primary Examiner—James F. Coan
Attorney, Agent, or Firm—Laurence R. Brown

[57] ABSTRACT

Self-contained reusable pour spout structure is made by means and methods compatible with low-cost bag production machinery and methods. Thus, a memory strip with an internal metallic strip and an external cover compatible with attachment to the bag material by heat welding, gluing or sewing, is simply placed at a desired access opening position, attached along its length on one bag layer and attached at opposite ends to two bag layers with the intervening distance unattached to the second bag layer. This strip then is manually deformed into a bowed position to open the spout and is straightened to close the spout over a plurality of use cycles. The bags so made are useful for containing and dispensing candy, cereal and like products.

11 Claims, 6 Drawing Figures

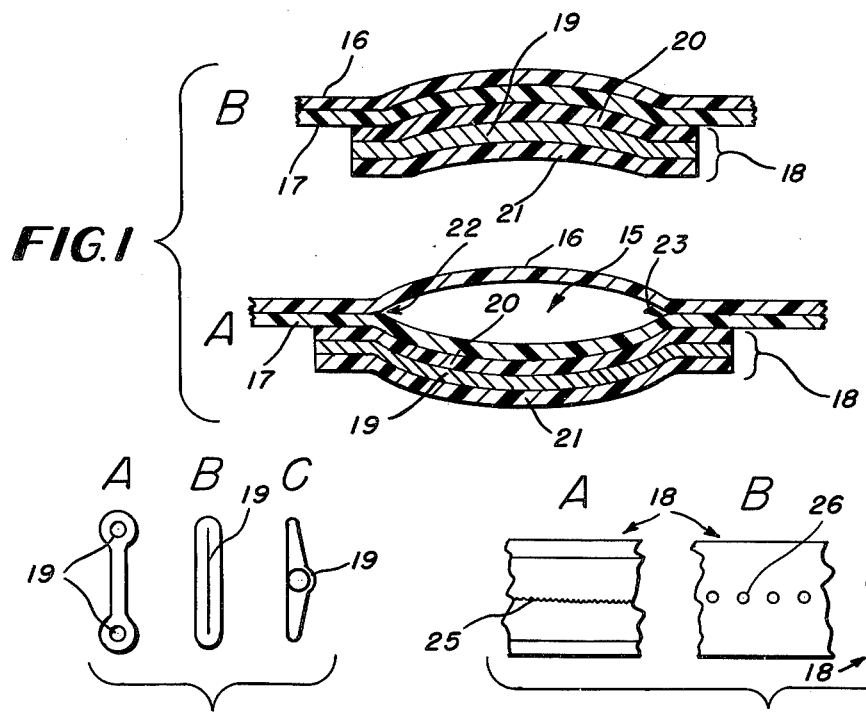
FIG. 1
FIG. 2
FIG. 3
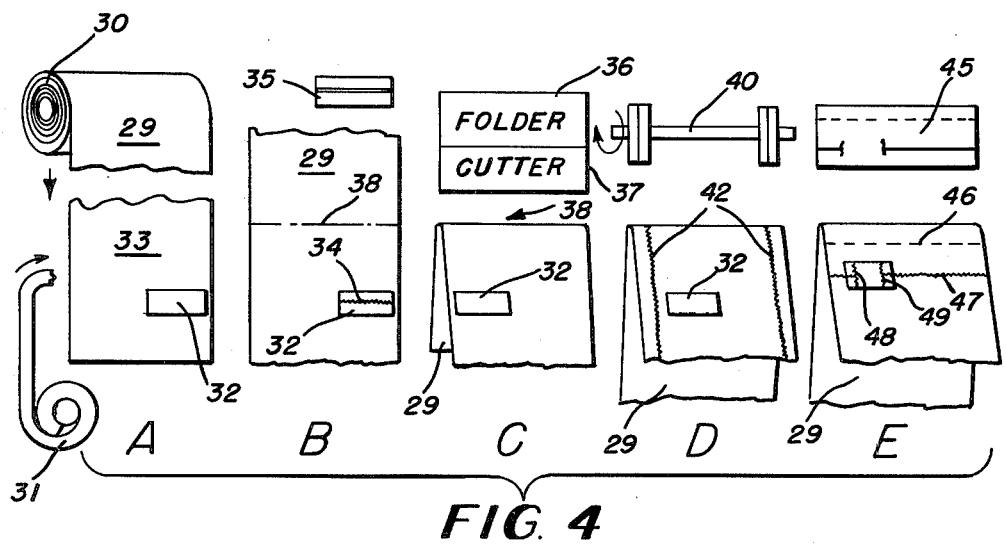
FIG. 4

MEANS AND METHODS OF MAKING BAGS WITH SPOUTS

This is a continuation-in-part of my copending U.S. application Ser. No. 226,536 filed Jan. 19, 1981 for Simplified Closure Spout for Flexible Walled Bags. In that application, the spout structure on the bags is disclosed and claimed.

TECHNICAL FIELD

This invention relates to means and methods of making bags and more particularly it relates to making bags with self-contained pour spouts.

Background Art

That application is an improvement over my previously issued U.S. Pat. No. 4,027,819 granted June 7, 1977 for Closure Device for Bags or Similar Devices.

The latter patent provided for a metallic corner member typically of aluminum riveted to a bag corner that could be partly broken off to form a corner spout in the bag. The improvement application provides for a longitudinal memory strip comprising a material that can be affixed to one bag layer along the length of the strip that is positionable as an integral part of the bag in any desired spout location for selective manual opening and closing.

This application is directed to means and methods of forming the improved bag with the self-contained spout structure that may be selectively opened and closed manually.

Disclosure of the Invention

An access opening in a flexible bag in the form of a self-contained spout structure for selective manual opening and closing is made by attaching a memory strip to the bag. This strip is of a material stiffer than the flexible bag material such as metal which holds its last configuration and can therefore hold a spout open or closed. The strip is reusable over a plurality of deforming cycles where it is bent back and forth into configurations that form the open and closed spout structure.

The memory strip is attached along its length to one bag layer in a manner causing both the bag layer material and the strip to move in unison. Further, the memory strip at two separated positions along the length is attached to two bag layers with the two bag layers unattached between these positions thereby to define the spout structure and corresponding access opening which is opened and closed by respectively bowing and straightening the strip manually.

The attachment of the memory strip to the flexible bag layers is made by heat welding, gluing or sewing, depending upon bag material, i.e. polyethylene, paper, burlap, etc. The memory strip comprises a longitudinal metallic strip carried in a strip of material compatible with attachment to the bag material, i.e. paper for gluing to paper bags, thermo plastic for heat welding to plastic bags, etc. Typically polyethylene bags are formed with heat sealing rollers or dies which engage the plastic memory strip carrier to attach it to one bag layer along its length and to both bag layers near each end.

Further objects, features and advantages of the invention will be found throughout the following description, drawings and claims.

BRIEF DESCRIPTION OF DRAWING

In the drawings:

FIGS. 1A and 1B are end views of a segment of the spout access opening structure afforded by this invention, shown in cross section;

FIGS. 2A, 2B and 2C is a set of typical memory strips for use with varied types of bag materials, shown in end view;

FIGS. 3A, 3B and 3C are corresponding segments in side view of the memory strips showing attachment features;

FIGS. 4A through 4E are diagrammatic views of means for performing various bag forming steps in the manufacture of bags in accordance with this invention;

THE PREFERRED EMBODIMENTS

Figure 5:
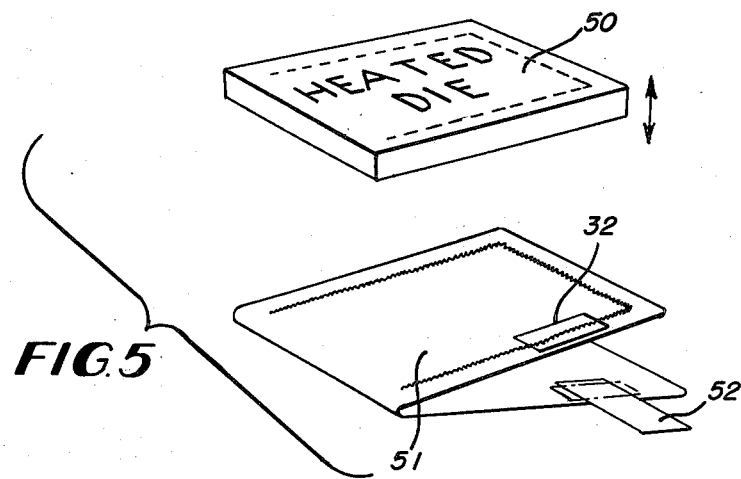
FIG. 5 is an exploded diagrammatic view of means for producing bags with self-contained spouts in accordance with this invention.

The spout structure afforded by this invention, as illustrated in FIG. 1, provides an access opening 15 between two layers 16, 17 of a bag by spout structure 18. The spout opening 15 is selectively opened or closed manually by means of the spout structure 18, which comprises a memory strip that is manually deformable into various configurations. Thus, the bowed position shown in FIG. 1A is an open spout position and the straight line configuration slightly bowed toward bag layer 16 as shown in FIG. 1B is a closed spout position. The layer thicknesses are exaggerated to provide for cross section identification of the structure of the various layers.

As may be seen from the end views of FIG. 2 and the section views of FIG. 1, the memory strip depends upon a metallic strip 19 long enough to span the desired length of access opening 15. It may have a wire or sheet configuration as shown in FIGS. 2A, 2B, etc. and is stiffer than the bag material of layers 16, 17, in the shown configuration plastic such as a thin polyethylene film. Typically copper stranded wire or aluminum sheeting can be used for the metallic memory layer 19. The strip need not be metallic as long as it affords the memory feature of remaining in place when deformed and is stiff enough to hold the bag layer access opening in the opened and closed spout positions.

In order to attach to the bag as a self-contained spout structure without rivets, etc., the memory strip is preferably coated or covered with at least one layer 20, 21 which may be affixed to the bag layers 16, 17. In the case of FIG. 1 it is shown as plastic, and is thus well adapted for heat welding to the plastic bag layers. As will be shown more particularly hereinafter, it is critical that the memory strip 18 be attached along its length to one bag layer 17 so that the strip and bag layer moves as a unit during manual deformation of the memory strip 18. Also it is critical that at the ends 22, 23 of the access opening that both layers 16, 17 of the bag be attached to the memory strip 18.

The memory strip side views of FIG. 3, corresponding to the end views of FIG. 2, show the adaptability of the memory strip to various bag materials. Thus, FIG. 3A at 25 indicates a heat weld line along the plastic cover portion of a memory strip for attachment for example to the plastic bag embodiment illustrated in FIG. 1.

In FIGS. 2A, 3B a paper cover for a thin aluminum strip might be attached similarly to a paper bag material layer by means of glue spots 26 along its length. Similarly with FIGS. 2C, 3C, a fabric could be stitched 27 onto a cloth or burlap bag material, etc.

To provide a bag with an access opening in the form of a self-contained spout structure which is manually opened and closed, in accordance with this invention, it is pertinent therefore that the memory strip 18 need be attached along its length to one layer of a bag to move in unison therewith over the spout opening length and at two separated positions 22, 23 to two layers of the bag with the second layer unattached between the separated attachment positions 22, 23 to form the self-contained manually reusable spout. The spout is reusable over a plurality of cycles before the metal fatigues or breaks.

Representative means for making bags with the attached memory strip forming a self-contained reusable spout is diagrammatically illustrated in FIGS. 4A through 4E. Thus the bag material, typically polyethylene film, may be taken as layer 29 from roll 30 to form the bags. The memory strip may similarly be taken from roll 31 and advanced through suitable mechanisms and a cutter to deposit strip 32 in holding panel 33 for placement at a desired position on the bag.

The strip 32 is then heat welded to the bag single layer film strip 29 at seam 34 along its length by means of an appropriate heated die 35. The film strip 29 is then folded by folder 36 at center line 38 and cut by cutter 37 to form a two layer bag of predetermined size, which carries the strip 32 at an appropriate spout opening position.

Heated rollers 40 can then seal the edges 41, 42 of the two film layers leaving the bottom open for filling and sealing at an appropriate time. A further heat seal and cutter die 45 then can serve to cut a tear strip 46 across the top of the bag for initial opening. For complete hermetic sealing a double layered film with a tear strip in only one layer may be used.

The heat weld across seam 47 and at the ends 48, 49 of the memory strip 32 then completes the spout structure while preventing or protecting the two bag layers from sealing together at the memory strip between end seams 48, 49. It is to be understood that different steps and materials may be used to make bags, but the disclosed embodiments show how typically the spout can be formed in various bag making processes by simply inserting the few steps it takes to locate the memory strip and attach it to the two different bag layers in the manner described herein.

In the embodiment of FIG. 5 a heated die 50 may be moved into heat welding position on the folded over polyethylene bag blank 51 for sealing the three open edge seams. A heat sink (metallic) plate 52 placed in registration with the memory strip 32 permits the ends thereof to be sealed to both bag layers, as shown in phantom. Thus the pour spout access opening is formed in the manner hereinbefore described by heat welding the strips to the bag layers.

Figure 6:
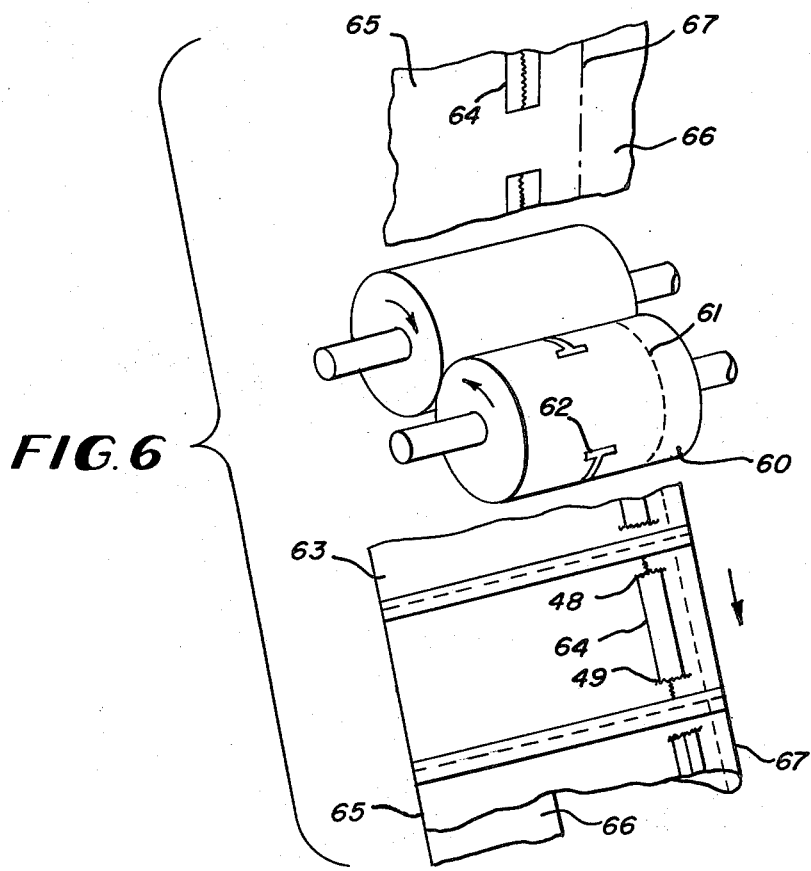
FIG. 6 is an exploded diagrammatic view of parts of bag making means operable in accordance with this invention to form the spout structure on the bags.

FIG. 6 illustrates another embodiment showing how the process can be integrated into bag making machinery, in this case typified by rollers 60 with cutting dies 61 and heating dies 62 for processing the moving bag film strip 63. In this example the memory strip 64 extends substantially across the bag width.

As hereinbefore described, the memory strip 64 is affixed to a single bag layer 65 of a two layer bag 66 before the film is folded along line 67 by a mechanism not shown. Thus when passing through roller 60 with the bags properly in register, the folded over two layers 65, 66 are welded together with the ends of the strip at 48, 49 in the manner aforesaid.

It is therefore evident that this invention provides novel means and methods for making bags with self-contained manually reusable spouts. The spouts may be used to dispense from a bag candy, cereal and like products from time to time. Those features of novelty believed representative of the spirit and nature of the invention are set forth with particularity in the claims.

Industrial Application

Bag making means and methods are set forth for forming self-contained low cost reusable pour spout structure on bags made of such materials as plastic, paper or fabric. The spout structure afforded is compatible with high-speed low-cost bag production equipment and may be employed as an adjunct process to existing bag making processes or machinery. The bags are useful as manually operable dispensing bags reusable over a plurality of opening and closing cycles. Thus, candy, cereal and such products may be packaged for dispensing parts of the stored goods from time to time as needed.

I claim:

1. The method of making bags formed of two adjacent flat layers sealed about the edges with an access opening thereinto in the form of a self-contained spout structure that may be selectively opened and closed manually, comprising the steps of:

positioning on one layer of a flexible bag forming material a longitudinal memory strip of a material stiffer than the flexible bag material that is manually deformable back and forth over a plurality of deforming cycles to assume resident configurations respectively for producing open and closed spout structure, attaching the memory strip immovably along its length to the bag layer to thereby form two adjacent unitary layers that move together in unison, disposing a second layer of bag forming material adjacent said one layer for defining a bag with the two layers, and attaching the two layers and the strip together at two separated positions along the length of the strip with the two layers unattached to each other between the two separated positions along the length of the strip to define thereby in a predetermined resident position related to a finished bag said access opening.

2. The method of claim 1 wherein the two layers are of a thermoplastic material of a class including polyethylene and the memory strip comprises a thermoplastic substance that can be heat welded to the layers, wherein the attaching steps comprise heat welding the strip and respective layers together.

3. The method of claim 2 including the preconditioning step of preparing said memory strip from a metallic strip and embodying said metallic strip into a member surrounding the metallic strip with a material similar to that of the bag layers.

4. The method of claim 1 comprising the ordered steps of first attaching the memory strip and thereafter forming the two layers into a bag configuration.

5. The method of claims 1 or 4 comprising the further steps of attaching the memory strip along a line spaced interiorly of a common outer edge of the two layers, attaching the two layers toegether along a seal line near said edge to seal the spout structure closed, and producing tear structure in both layers between the memory strip line and the line near said edge for manual removal of both layers along the sealed edge to provide access to the bag opening defined by said pour spout.

6. The method of claim 1 which comprises therein the steps of positioning the two layers adjacent each other, protecting the spout opening region along the length of the strip from attachment to the second layer and attaching the two layers together along a line adjacent one edge of a bag configuration to form a closure end thereof with said pour spout therein.

7. Apparatus for making bags formed of two adjacent flat layers sealed around the edges with self-contained reusable spout structure thereon as the access opening thereinto, comprising in combination, means for positioning on one layer of a flexible bag forming material a longitudinal memory strip of a material stiffer than the flexible bag material that is deformable back and forth to remain in a shaped configuration over a plurality of deformation cycles thereby for forming a pour spout and selectively holding it in manually selectable open and closed spout positions, means for attaching the memory strip along its length immovably to the bag layer to thereby form unitary bag-strip structure that move together in unison, means for disposing a second layer of bag forming material adjacent said one layer for defining a bag with the two layers, and means for attaching the two layers and the strip together at separate positions along the length of the strip with the two layers unattached to each other therebetween along the length of the strip to define thereby in a predetermined resident position related to a finished bag said access opening.

8. Apparatus as defined in claim 7 wherein the apparatus is for making bags of thermoplastic plastic material of a class including polyethylene, wherein the means for attaching comprises heat sealing means for welding plastic members together, and wherein the memory strip comprises a plastic covered metallic strip.

9. Apparatus as defined in claim 7 wherein the means for attaching the two layers and strip together with two layers unattached along the length of the strip comprises means for attaching the two layers together along a path extending from the two layers onto the strip only at a position near two end portions of the strip.

10. The method of providing bags formed of two adjacent flat layers sealed around the edges with an access opening thereinto in the form of a spout, comprising the steps of, affixing immovably to one bag layer along a desired spout opening length on the layer a longitudinal memory strip of a manually deformable material that will retain its deformed position whereby the bag layer and strip move in unison over the spout opening length as a unitary two layered structure, and affixing to the bag layer and strip portion that move in unison at two separated positions along the strip a further bag layer with the further bag layer attached to the strip at the two separated portions and unattached from the strip between the two separated positions.

11. Apparatus for providing bags formed of two adjacent flat layers sealed around the edge with an access opening thereinto in the form of a spout, comprising in combination, means for affixing immovably to one bag layer along a desired spout opening length on the layer a longitudinal memory strip of a manually deformable material that will retain its deformed position whereby the bag layer and strip move in unison over the spout opening length as a unitary two layered structure, and means for affixing to the bag layer and strip portion that moves in unison at two separated positions along the strip a further bag layer with the further bag layer attached to the strip at said two separated positions and unattached from the strip between the two separated positions.

* * * * *